United States Patent [19]

Leung

[11] 4,055,772
[45] Oct. 25, 1977

[54] DIGITALLY CODED ELECTRICAL SUPPLY SYSTEM

[75] Inventor: Tommy Y. Leung, Cassopolis, Mich.

[73] Assignee: CTS Corporation, Elkhart, Ind.

[21] Appl. No.: 628,580

[22] Filed: Nov. 3, 1975

[51] Int. Cl.² ............................................. H02G 3/00
[52] U.S. Cl. .................................................. 307/10 R
[58] Field of Search ................. 307/10 R; 235/151.21; 340/171 R, 203, 204, 205, 206, 178, 52 R

[56] References Cited

U.S. PATENT DOCUMENTS

| 3,651,454 | 3/1972 | Venema et al. | 307/10 R |
| 3,819,949 | 6/1974 | Ueda et al. | 307/10 R |
| 3,821,559 | 6/1974 | Ueda et al. | 307/10 R |

*Primary Examiner*—Herman Hohauser
*Attorney, Agent, or Firm*—John J. Gaydos

[57] ABSTRACT

A digitally coded electrical supply system is provided for the selective control, through a plurality of code transmission conductors, of electrical power through a single power bus to a large plurality of electrical loads. The system includes a number generator for sequentially and cyclically producing digitally coded numbers into a plurality of code transmission conductors, a plurality of load decoders, a plurality of power switches, a power bus and a plurality of electrical loads. The system also includes a plurality of switch decoders, and a plurality of electrical switches, each switch connecting one of the switch decoders to one of the load decoders through a common activator conductor. In operation, the closing of any of the electrical switches is effective, in cooperation with the connected one of the switch decoders and the common activator cable, to activate an associated one of the load decoders and to supply electrical power to the associated one of the electrical loads.

19 Claims, 11 Drawing Figures

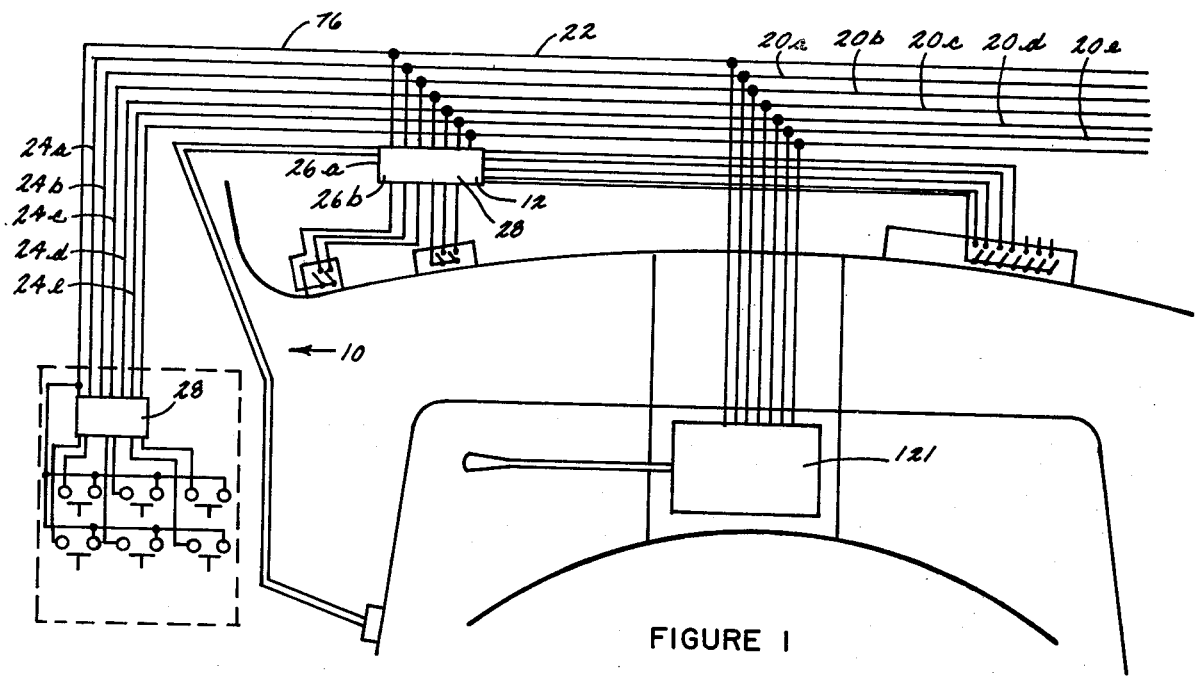

FIGURE 1

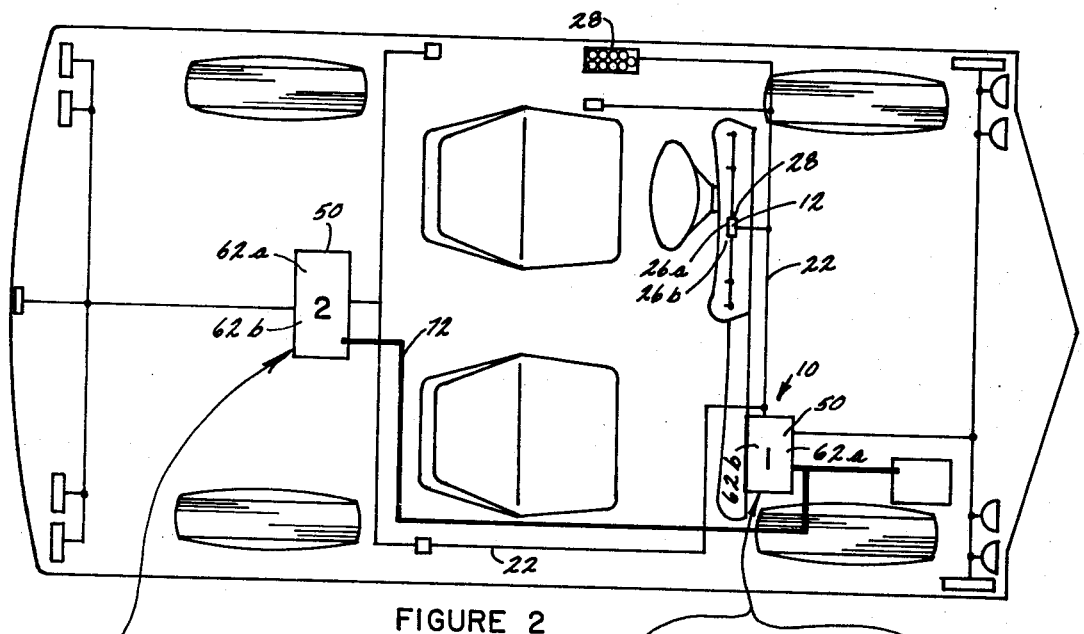

FIGURE 2

LICENSE PLATE LAMPS
BRAKE LAMPS
TAIL LAMPS
BACKUP LAMPS
MARKER LAMPS
DECK LID LATCH SWITCH
TAILGATE WINDOW MOTOR
HEATED BACKLITE
TURN SIGNALS
FUEL GAGE SENDER
TAILGATE WASHER
ELECTRONIC BRAKING

POWER DOOR LOCKS
POWER SEAT
POWER WINDOWS
WARNING LAMPS
PARKING BRAKE WARNING SWITCH
CORNER LAMPS
TURN LAMPS
HI & LOW BEAM HEAD LAMPS
HORN
WIPER MOTOR
WASHER PUMP MOTOR
IGNITION
BLOWER MOTOR

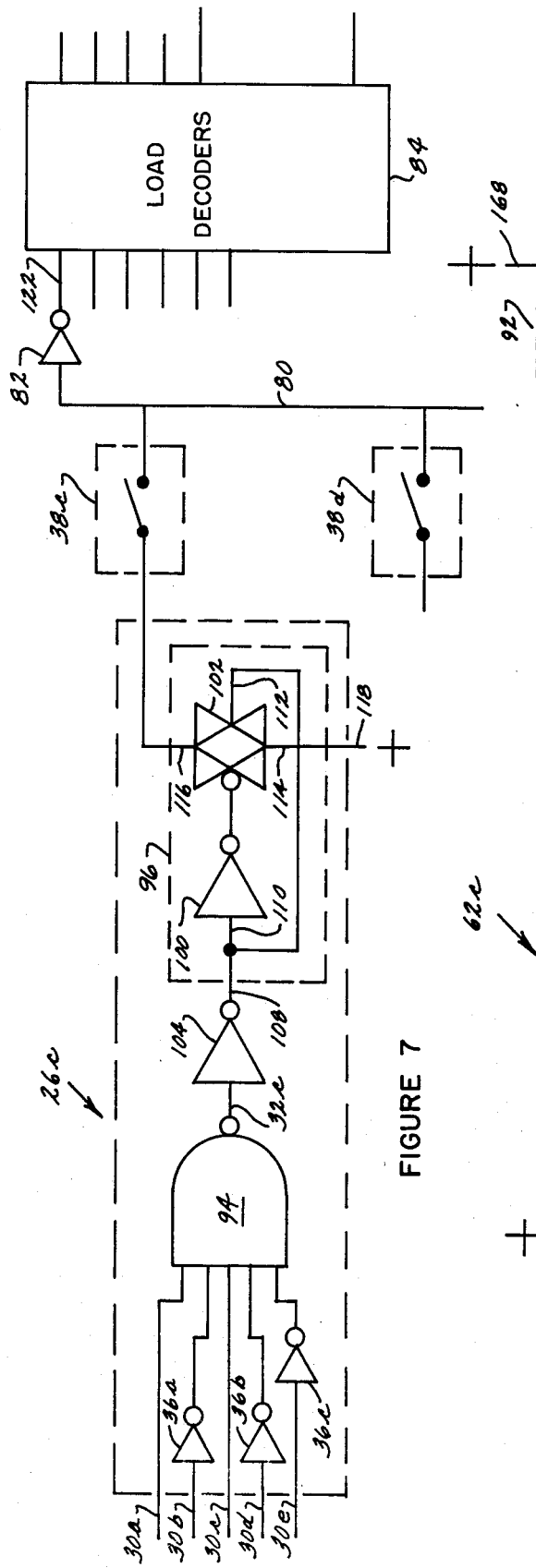
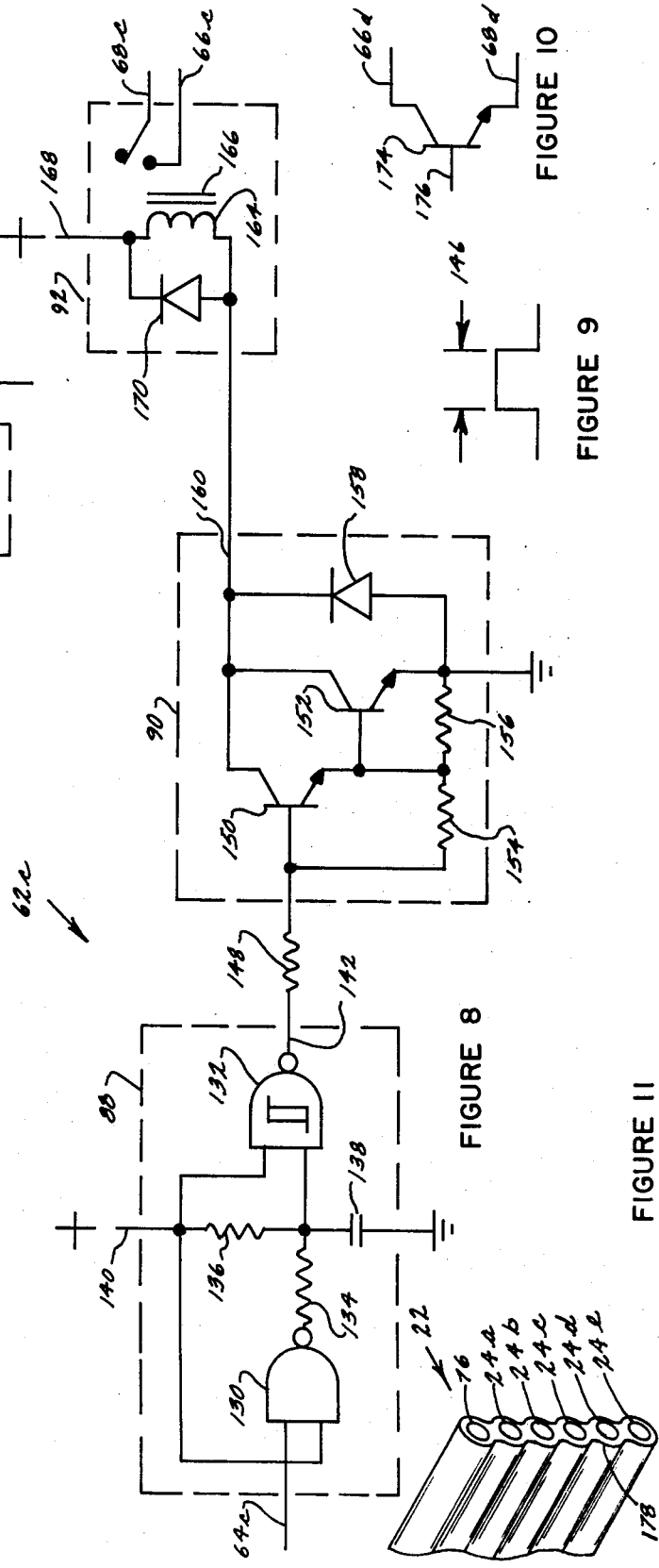
FIGURE 7
FIGURE 8
FIGURE 9
FIGURE 10
FIGURE 11

DIGITALLY CODED ELECTRICAL SUPPLY SYSTEM

The present invention relates generally to electrical wiring systems primarily but not exclusively for motor vehicles, and more particularly, to a multiplexing system in which digitally coded numbers are transmitted through a plurality of code transmission conductors to control the switching of power between a power bus conductor and a plurality of electrical loads.

Although the automotive manufacturers have improved considerably various parts of an automobile such as the engine starter and transmission as well as controlling climate within the passenger compartment, during the past 50 years hardly any improvements have been made to the automotive wiring system since the first use of a battery as an electrical power source for an automobile. Automotive electrical supply systems have become quite complex due to the large number of electrical devices or accessories currently available and usually provided with an automobile. In a typical automotive electrical supply system, the switches for operating the devices are by necessity located for easy actuation near and preferably in front of the driver of the automobile. Yet heavy wires or power bus conductors are still connected from the battery to the switches and from the switches to the devices for controlling the electrical current to the devices. The result is an electrical supply system utilizing an excessive quantity of heavy copper wires, requiring an excessive amount of space under the dash of an automobile and elsewhere, requiring complex and expensive connectors that are difficult to assemble, and requiring an excessive amount of installation time. It would, therefore, be desirable to provide an improved electrial supply system for controlling electrical power in a motor vehicle that is economical to make and install and does not substantially increase the price of an automobile.

Automotive diagnostic equipment manufacturers have kept pace with the technological developments by continually providing improved automotive diagnostic and test equipment. The wiring system currently used in an automobile, however, makes it difficult to analyze by computer, i.e., automatically testing and analyzing an automotive electrical supply system, unless separate wires are connected from the device to be checked or tested to an electrical connector that can be plugged into the diagnostic equipment. It would, therefore, be desirable to provide an automotive electrical supply system that is adaptable or can be readily adapted to diagnostic testing without providing specific test lead wires from a computer to the device to be tested.

Elaborate electrical supply systems employing expensive multiplexing systems have been developed through the years and are currently being used on jet aircraft. Obviously, the electrical supply system in an aircraft is very sophisticated and hence expensive, since minimum weight and maximum reliability are essential. During the past decade and especially since the advent of components such as the transistor and the integrated circuit and the utilization of a computer operated multiplexing system employed on jet aircraft, automotive manufacturers and suppliers associated therewith have been investigating the feasibility of employing a single power bus capable of simultaneously conducting high current from the battery to the accessory as well as transmitting signals from a computerized input or in the alternative of transmitting such signals through an associated individual conductor and, at the accessory or device, decoding the signals with synchronized computerized equipment for energizing such accessory. It is well known in the art to use a single power supply bus with a plurality of relays and connecting each of the relays to each of the accessories and to each of the switches with separate wires as described in U.S. Pat. No. 3,745,419 issuing on July 10, 1973. Although the multiplexing system and the electrical supply system on an aircraft are very reliable, the cost of such system is prohibitive for use in an automobile since synchronization between the multiple data sources and each of the accessories can only currently be achieved with the use of expensive electronic equipment. Integrated circuit and computer engineers and scientists have devoted much research effort in attempting to develop an economical multiplex electrical supply system for a motor vehicle such as is currently used in jet aircraft for the simple reason that if an economical supply system could be developed for an automobile, there would be an increased demand for computers and integrated circuits. As of this date, engineers and scientists solely and jointly have, however, been unable to propose an economically feasible electrical supply system for an automobile. Moreover, the motor vehicle manufacturers also have been unable to develop an equivalent system economically feasible for use in automobiles. A certain amount of optimism in this area exists but this optimism is based solely on the future lower cost of the synchronized input and output computers. Digital or binary codes are currently used in telephone and computer equipment for transferring and storing bits of information. It would, therefore, be desirable to provide a motor vehicle with an improved electrical supply system having digitally coded electrical switches operable at an instrument panel within convenient arm reach of the driver for controlling power switches connected to a plurality of spaced distribution boxes connected to a battery of an automobile with a single power supply line.

An object of the present invention is to reduce the complexity of electrical systems. Another object of the present invention is to provide a power bus system controlled by a low current switching system. Still another object of the present invention is to provide a power bus system controlled by a digital switching system.

Another object of the present invention is to provide an electrical supply system for motor vehicles having a plurality of spaced distribution boxes directly connected to a single power supply bus connected to a battery and a plurality of power switches associated with the distribution boxes are employed for electrically connecting the power supply bus to the load when a manually operated low current or digitally coded signal switch mounted on an instrument panel or on a door within convenient reach of the vehicle driver is manually actuated.

Still another object of the present invention is to provide a motor vehicle, e.g., an automobile, with at least a pair of power distribution centers, one in the front compartment of the automobile and one in the rear compartment of the automobile or with three distribution centers, one in each of the engine, passenger and trunk compartments and employing digitally coded electrical signals to each of such distribution centers for energizing accessories located in such area.

Yet another object of the present invention is to employ a digitally coded electrical supply system in motor vehicles wherein a plurality of spaced distribution boxes are directly connected to a single power supply bus, power switches are connected to the portions of the supply bus at each of the boxes, and a multiwire transmission cable electrically connects each of the power switches to signal switches on an instrument panel, the signal switches being manually operable for initiating digital coded numbers into the transmission cable for energizing the power switches and connecting the supply bus at the distribution boxes to the accessories.

Yet a further object of the present invention is to provide an electrical wiring system for an automobile having a single power supply bus and a transmission cable employing a plurality of wires for transmitting binary information therethrough, and operating power switches and connected to the supply bus, each of the power switches being energizable by a low current signal switch located near the vehicle driver and with the switch decoder located in close proximity to the signal switch.

Still a further object of the present invention is to provide a digitally coded electrical supply system for a motor vehicle wherein a plurality of signal switches is clustered together at an instrument panel or door conveniently operable by the vehicle driver and wherein a switch decoder is also disposed in close proximity to the signal switches thereby minimizing and standardizing assembly of the vehicle digitally coded electrical supply system.

Further objects and advantages of the present invention will become apparent as the following description proceeds, and the features of novelty characterizing the invention will be pointed out with particularity in the claims annexed to and forming a part of this specification.

In accordance with the broader aspects of this invention, there is provided a digitally coded electrical system including a digital clock producing spaced electrical pulses and a digital number generator connected to the digital clock, both sequentially and cyclically producing digitally coded electrical pulses in a plurality of code output conductors. A code transmission cable having a plurality of code transmission conductors is connected to the number generator with the code transmission conductors being connected to respective ones of the code output conductors.

A switch decoder is connected to the code transmission conductors and is effective to produce a cyclic and digital activating signal as the digital number generator cyclically generates one of the numbers. An electrical switching device connected to the switch decoder receives the digital activating signal from the switch decoder. The switch decoder, together with the electrical switching device, provide an activating means effectively producing a signal when the electrical switching device is in the conducting state and when the switch decoder receives the one number from the code transmission cable. A load decoder is connected to the code transmission conductors in the code transmission cable and effectively produces an output signal when the signal from the switching device is supplied to the load decoder and when, at the same time, the number generator produces the one number.

A power switch connected to a power bus conductor also is connected to the load decoder for receiving the output signal therefrom and effectively connects the power bus conductor to a power output conductor when the number generator produces the one number and when, at the same time, the electrical switching device is in the conducting state. The power switch includes means for maintaining electrical communication between the power bus conductor and the power output conductor for a period of time greater than the time required for the number generator to repeat cyclically the one number, thus the power switch maintains constant electrical communication between the power bus conductor and the power output conductor whenever the electrical switching device is in the conducting state. The digitally coded electrical system includes a switch decoder, an electrical switching device, a load decoder, and a power switch, a plurality of the switch decoders preferably being included in an integrated circuit, and a plurality of load decoders preferably being included in another integrated circuit.

For a better understanding of the present invention, reference may be had to the accompanying drawings wherein the same reference numerals have been applied to like parts and wherein:

FIG. 1 is a schematic drawing of a motor vehicle instrument panel having clusters of signal switches for operating power switches connected to a distribution box;

FIG. 2 is a schematic of a motor vehicle having a pair of distribution boxes connected in parallel to a battery, the accessories connected to each of the boxes, and a transmission cable connecting the signal switches adjacent to the vehicle driver to the distribution boxes;

FIG. 7 is a schematic of an alternate circuit for a first portion of the present system of FIG. 3;

FIG. 8 is a schematic of a circuit for another portion of the system of FIG. 3;

FIG. 9 is a drawing of the electrical wave form produced by a part of the FIG. 8 circuit;

FIG. 10 is a schematic of a solid-state switching device for alternate use in the FIG. 8 circuit; and FIG. 11 is a cross-section of the code transmission cable.

Figure 3:
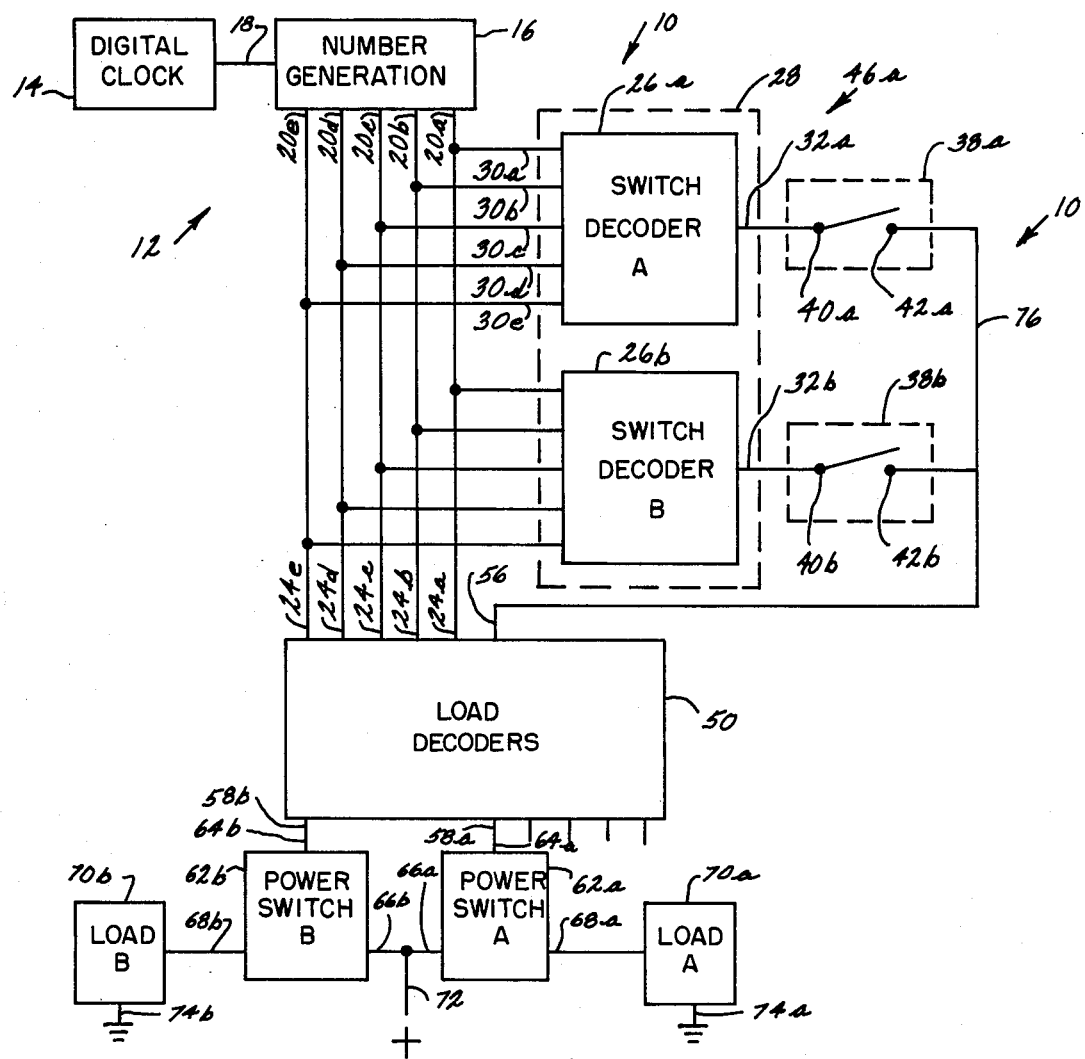
FIG. 3 is a schematic of a digitally coded electrial supply system of the present invention.

Referring now to the drawings, and more particularly to FIGS. 1–4, a digitally coded electrical supply system, generally depicted at 10, includes code generator means 13 which includes a digital clock 14 (see FIG. 3) and a digital number generator or number generator means 16 electrically connected by means of conductor 18. The digital clock 14 produces a plurality of spaced electrical pulses to the number generator 16 through the conductor 18, and the number generator 16 sequentially and cyclically encodes digital numbers into a plurality of output conductors 20a–20e, additional conductors being shown in FIG. 1. A code transmission cable 22 (FIGS. 1–3 and 11), e.g., a ribbon type cable comprising a plurality of code transmission conductors 24a–24e connected to respective ones of the output conductors 20a–20e is suitably disposed within a motor vehicle.

Figure 4:
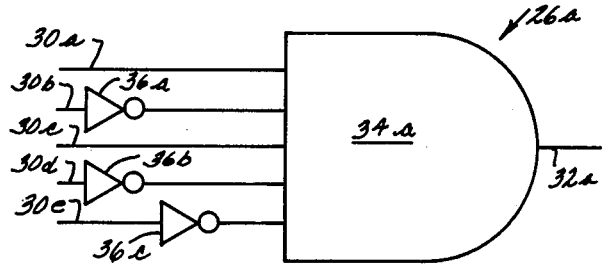
FIG. 4 is a schematic of a switch decoder useable in the system of FIG. 3.

The electrical system 10 further includes a first switch decoder or switch decoder means 26a and a second switch decoder or switch decoder means 26b, it being understood that the two identical switch decoders 26a, 26b are typical of any number of switch decoders that may be required in a typical system and that may be included in one or more integrated circuits readily available on the market and designated by box 28 (see FIGS. 1-3). In the case of a single integrated circuit as depicted by the box 28, only one set of input conductors 30a-30e are required to connect the switch decoders 26a, 26b to the code transmission conductors 24a-24e. Since the switch decoder 26a is typical of all, a description only of the switch decoder 26a will suffice. In a preferred form of the invention, the switch decoder 26a is, as shown in FIG. 4, a digital logic gate or AND gate 34a and digital inverters 36a-36c are interposed into the input conductors 30a-30e and cooperate with the AND gate 34a to encode the switch decoder 26a for one particular digitally coded number. If the input conductors 30a-30e are respectively coded for the numerical values of one, two, four, eight, and 16, the switch decoder 26a of FIG. 4 is encoded to decode the number five. When the number generator 16 digitally encodes the number five, digital activating signals 1-0-1-0-0 are encoded into the code transmission conductors 24a-24e respectively of the transmission cable 22. The digital inverters 36a--36c invert the digital 0 signals to 1 signals in the input conductors 30b, 30d and 30e and produce a 1 signal in all of the input conductors connected to the AND gate 34a. When the number generator 16 encodes the number five into the code transmission conductors 24a-24e, the AND gate 34a effectively produces a cyclic and digital activating signal in the output activating conductor 32a at a frequency in accord with the cyclic encoding of the number five of the number generator.

In accord with the present invention, the electrical system 10 further includes a first electrical switching device 38a having input and output poles 40a, 42a and a second electrical switching device 38b having input and output poles 40b, 42b. The electrical switching devices 38a, 38b are respectively connected to the switch decoders 26a, 26b by the output activating conductors 32a, 32b. The electrical switching devices 38a and 38b are symbolically illustrated as mechanically actuated switches and, in one configuration of the present invention, are manually actuated from nonconducting states, as shown, to conducting states. The switch decoder 26a and the electrical switching device 38a cooperate to provide an activating means 46a. The activating means 46a effectively produces activating digital activatng signal when the electrical switching device 38a is in the conducting state, the digital activating signal being produced each time the number generator 16 encodes the number for which the switch decoder 26a is coded.

Figure 5:
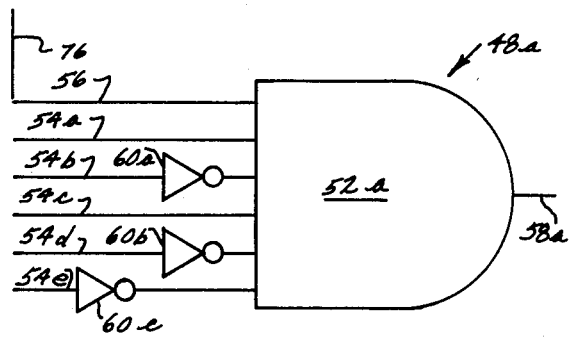
FIG. 5 is a schematic of a load decoder useable in the system of FIG. 3.

Referring now to the drawings, the electrical system 10 further includes a plurality of load decoders or load decoder means 48a (see FIG. 5), the plurality being symbolically represented by the box 50 in FIGS. 1-3. The load decoder 48a includes a digital logic gate or AND gate 52a having a plurality of input conductors 54a-54e having an input activating conductor 56, and a plurality of power switch activating conductors 58a. The load decoder 48a further includes digital inverters 60a-60c inserted into the input conductors 54b, 54d and 54e respectively. Specifically the load decoder 48a is coded to decode the number five in the same manner as was described for the switch decoder 26a of FIG. 4. However, the load decoder 48a includes the input activating conductor 56 which must receive a 1 signal at the same time as the code input conductors 54a-54e deliver a 1 signal to the AND gate 52a before a digital output signal, or 1 signal is supplied to the power switch activating conductor 58a. The box 50 in FIGS. 1-3 may include any required number of load decoders such as the load decoder 48a of FIG. 5. Each load decoder is designated to decode one number, all of the load decoders being connected in parallel to the code transmission conductors 24a-24e, e.g., conductor 54a being connected to conductor 24a, and each load decoder has a power switch activating conductor such as the power switch activating conductor 58a of the load decoder 48a.

Referring again to FIGS. 1 and 3, the electrical system 10 includes a power switch or power switching means 62a and a power switch or power switching means 62b. The power switches 62a, 62b respectively are connected to the load decoders designated by box 50 by the power switch activating conductors 58a, 58b. The power switches 62a, 62b respectively include power input conductors 66a, 66b and power output conductors 68a, 68b. The power output conductor 68a is connected to an electrical load 70a and the power output conductor 68b is connected to another electrical load 70b. The power input conductors 66a, 66b are connected to a power bus conductor 72 and the loads 70a, 70b are connected to ground by conductors 74a, 74b respectively.

During operation, when the switch decoder 26a receives the number for which it is encoded, it produces a cyclic and digital activating signal in the output activating conductor 32a. If the electrical switching device 38a is in the conducting state, this digital activating signal is delivered through the input activating conductor 56 to the load decoder means 48a. This digital activating signal from one of the switch decoders 26a will be pulsed phased with the encoding of the number from the number generator 16. Thus digital signals, having a value of 1 will be applied simultaneously to the AND gate 52a (FIG. 5) through the input activating conductor 56 and through the input conductors 54a-54e and a pulsed digital output signal of 1 will be applied to the switching conductor 64a to control intercommunication of the power input conductor 66a and the power output conductor 68a of the power switching means 62a.

The power switching means 62a includes means for maintaining electrical communication between the power input conductor 66a and the power output conductor 68a for a period of time in excess of the time which is required for the number generator 16 to again encode the number for which the switch decoder 26a and the load decoder means 48a are encoded; thus the power input conductor 66a and the power output conductor 68a are maintained in electrical communication when the electrical switching device 38a is in the conducting state.

The means for maintaining electrical communication between conductors 66a and 68a will be described in conjunction with the description of FIG. 8. FIG. 7 shows another embodiment of the present invention and includes a switch decoder means 26c, electrical switches or electrical switching devices 38c and 38d, a common activator conductor 80, a digital inverter 82, a box 84 depicting a plurality of load decoders such as load decoder or load decoder means 48c of FIG. 6. A plurality of switch decoders, such as the switch decoder 26c are connected to a plurality of electrical switches such as the electrical switches 38c and 38d, the digital inverter 82, and a plurality of load decoders, such as the load decoder 48c and as depicted by the box 84, to replace similar components in the circuit shown in FIG. 3. In like manner, a power switch or power switching means 62c (see FIG. 6) includes an electronic triggering circuit 88, e.g., a Schmitt trigger, a Darlington power driver or solid-state switching device 90, and a mechanical relay 92. A plurality of power switches, such as the power switch 62c can be used in the circuit of FIG. 3, with or without replacing portions of the FIG. 3 circuit with switch decoders such as the switch decoder 26c of FIG. 7. Referring now to FIG. 7, the switch decoder means 26c includes a digital logic gate or NAND gate 94 having code input conductors 30a-30e having digital inverters 36a-36c inserted into the input conductors 30a-30e as shown, and having an output activating conductor 32c.

In addition, the switch decoder means 26c includes transmission gate means 96. The transmission gate means 96 includes a digital inverter 100 and a transmission gate 102. When the NAND gate 94 receives all 1 signals from the code input conductors 30a-30e, a 0 signal is produced in the output activating conductor 32c and a digital inverter 104 inverts the 0 signal to a 1 signal in a conductor 108. The 1 signal in the conductor 108 is applied to a pair of gate input conductors 110 and 112, and the transmission gate 102 effectively provides electrical communication between a gated power conductor 114 and power conductor 116 connected to the electrical switching device 38c. Thus, in the FIG. 7 embodiment, a digital activating signal is provided to the electrical switching device 38c when the NAND gate 94 decodes the number for which it is encoded; but, a separate source of electrical potential 118 is cyclically gated to the electrical switching device 38c through the gate 102 rather than using the electrical potential of the cyclic electrical pulse in the output activating conductor 32c directly to provide the electrical potential of the digital activating signal. When the electrical switching device 38c is closed (see FIG. 7), a cyclic and digital activating signal, having a value of 1, is supplied to a digital inverter 82, and the digital inverter 82 supplies a digital signal of 0 to an input activating conductor 122 of the box 84.

Figure 6:
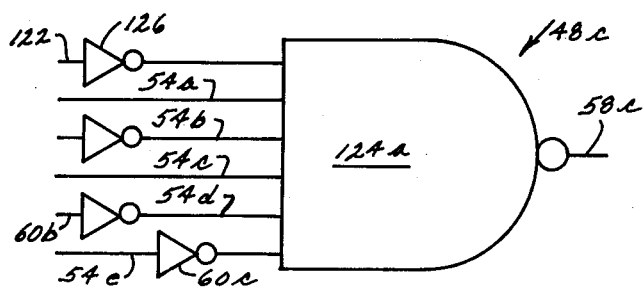
FIG. 6 is a schematic of an alternate circuit of a load decoder for use in the portion of the system depicted in FIG. 7.

Referring now to FIG. 6, the load decoder or load decoder means 48c includes a digital logic gate or NAND gate 124a having the input activating conductor 122, code input conductors 54a-54e, digital inverters 60a-60c inserted into the code input conductors 54b, 54d, 54e, a digital inverter 126 being inserted into the input activating conductor 122 and a power switch activating conductor 58c. The load decoder 48c (see FIG. 7) is the same as the load decoder 48a (see FIG. 5) except that the load decoder 48c utilizes the NAND gate 124a rather than the AND gate 52a and the input activating conductor 122 includes a digital inverter 126. Thus, a 0 input to the inverter 82 (see FIG. 7) along with the coded input to the code input conductors 54a-54e (see FIG. 6) is required to produce a digital output signal of 1 in the power switch activating conductor 58c. The digital inverter 82 in the common activator conductor 80 shown in FIG. 7 is necessary because the digital inverter 126 (see FIG. 6) is part of the load decoder means 48c.

As is well known in the art, the electronic triggering circuit 88 (see FIG. 8) maintains electrical communication between a power input conductor 66c and a power output conductor 68c of the mechanical relay 92. The electronic triggering circuit 88 includes a switching conductor 64c driving a gate 130 which in turn drives a gate 132 through a resistor 134 which is connected to the junction between resistor 136 and capacitor 138. The period of the output pulse of the circuit 88 has a wave form greater than the time necessary for the number generator 16 (see FIG. 3) cyclically to repeat any given number. Thus with a cyclic output into the conductor 58c of the NAND gate 124a, a constant output signal of 1 is produced in the conductor 142.

The power driver 90 is connected to the electronic triggering circuit 88 by a resistor 148 and includes switching transistors 150 and 152, resistors 154 and 156, and a diode 158 connected as shown in FIG. 8. The power driver 90 provides power amplification of the potential supplied to it through the resistor 148, it being understood that a single pulsed input to the switching conductor 64c provides a wave form at the output of circuit 88 but, since the switching conductor 58c receives pulses from the load decoder 48c at spaced intervals of time less than the period of the wave form, a constant potential is supplied to the power driver go through the resistor 148. Thus the power driver 90 receives a constant potential from the circuit 88 and supplies a constant potential of higher power to a conductor 160. The mechanical relay 92 connected to the power driver 90 includes a coil 164, a core 166. The power input conductors 66c, 68c are connected to the relay contacts and a conductor 168 is connected to a source of electrical power. A diode 170 connected across the coil 164 bypasses reverse potential transients and obviates collapse of the magnetic field in the coil 164.

The mechanical relay 92 may optionally be replaced by a solid-state switching device 174 (see FIG. 10). The solid-state switching device 174 includes a power input conductor 66d, a power output conductor 68d and a control conductor 176. The control conductor 176 may be drivingly connected to the conductor 160 shown in FIG. 8. In a preferred embodiment, referring now to FIG. 11, the code transmission cable 22 includes the code transmission conductors 24a-24e including the common activator conductor 76 of FIG. 3, all encased in an insulating cover 178.

In essence, the present invention provides code generator means 12 for sequentially and cyclically producing digitally coded electrical pulses into a plurality of code transmission conductors 24a-24e, load decoder means 48a or 48c for decoding one of the numbers, and activating means for selectively activating the load decoder means, the activating means including both a switch decoder 26a or 26c and an electrical switching device 38a or 38c.

When a plurality of switch decoders and electrical switching devices are included in a system, a common activating conductor is used to interconnect the electrical switching devices (38a, 38c, etc.) to parallel connected input activating conductors (76, 80, etc.) connected to the load decoders. Each switch decoder produces its respective digital activating signal in pulsed phase with the decoding of one particular number by the load decoder. Thus the common activator conductor (76 or 80) is not used simultaneously by two load decoders and each load decoder is capable of activation only by a digital activating signal that exists when that particular load decoder receives the number for which it has been encoded.

In application, the code transmission cable 22 (see FIG. 11) is provided with a sufficient quantity of code transmission conductors to encode digitally one number for each load or electrical switching function to be controlled, a switch decoder is provided for each load to be controlled, each switch decoder being provided with a logic gate having the same number of code input conductors as the number of code transmission conductors, and a load decoder is provided with a logic gate having one code input conductor for each code transmission conductor and an extra input conductor for use as the input activating conductor. It is obvious from an examination of the FIGS. 1-3 that the number generator may be connected to the code transmission cable at any convenient point and that both the switch decoders and the load decoders may be connected to the code transmission cable at any location or locations, either separately or in groups to facilitate operation and diagnostic testing of all of the accessories of an automobile such as indicated at FIG. 2.

While there have been illustrated and described what is at present considered to be a preferred embodiment of the present invention and modifications thereof, it will be appreciated that numerous changes and modifications are likely to occur to those skilled in the art, and while the application for the present invention has been described as being an electrical system for automobiles, it will be appreciated that numerous other applications, such as wiring systems for large office buildings and factories may effectively utilize the present invention. It is intended in the appended claims to cover all those changes, modifications and applications which fall within the true spirit and scope of the present invention.

What is claimed as new and desired to be secured by Letters Patent of the United States is:

1. In a digitally coded electrical supply system, the combination comprising a code transmission cable having a plurality of code transmission conductors therein, code generator means being connected to said plurality of code transmission conductors for sequentially and cyclically producing digitally coded electrical pulses simultaneously in said code transmission conductors corresponding to respective ones of a plurality of numbers, load decoder means being connected to said code transmission conductors for decoding one of said numbers and for producing a digital output signal when both said load decoder means is activated and said one number is digitally encoded into said code transmission conductors and activating means being connected to said load decoder means for selectively activating said load decoder means.

2. The system as claimed in claim 1, wherein said system includes power switching means having a switching conductor connected to said load decoder means to receive said digital output signal therefrom, having a power input conductor, and having a power output conductor for controlling electrical communication between said power conductors in response to said digital output signal.

3. The system as claimed in claim 2, wherein said power switching means includes means for maintaining electrical communication between said power conductors for a period of time in excess of that in which said code generator means cyclically repeats the encoding of said one number into said transmission conductors.

4. The system as claimed in claim 1, wherein said activating means includes an electrical switching device is operable in conducting and nonconducting states, and said digital output signal is produced when said electrical switching device is operated to one of said states.

5. A system as claimed in claim 4, wherein said electrical switching device comprises a mechanically actuated switch.

6. A system as claimed in claim 4, wherein said electrical switching device is manually actuated.

7. The system as claimed in claim 1, wherein said activating means comprises means for selectively supplying a cyclic and digital activating signal to said load decoder means in pulsed phase with the cyclic generation of said one number by said code generator means.

8. The system as claimed in claim 7, wherein said system includes second load decoder means being connected to said code transmission conductors for decoding a second one of said numbers and for producing a second digital output signal when both said second load decoder means is activated and when said second one of said numbers is digitally encoded into said transmission conductors, second activating means being connected to said second load decoder means for selectively supplying a second cyclic and digital activating signal to said second load decoder means simultaneously with the generation of said second one of said numbers by said code generator means, and said connection of first said activating means to first said load decoder means and said connection of said second activating means to said second load decoder means comprises a common activator conductor receiving and transmitting both of said cyclic and digital output signals.

9. The system as claimed in claim 1, wherein said activating means comprises switch decoder means being connected to said code transmission conductors for decoding said one number and for producing a digital activating signal when said code generator produces said one number, and an electrical switching device is connected to said load decoder means to provide said connection of said activating means to said load decoder means and is connected to said switch decoder means.

10. The system as claimed in claim 9, wherein said switch decoder means comprises a digital logic gate having a plurality of code input conductors, and said connection of said switch decoder means to said code transmission conductors comprises the connection of respective ones of said code input conductors to said code transmission conductors.

11. The system as claimed in claim 10, wherein said digital logic gate comprises an AND gate.

12. The system as claimed in claim 11, wherein said switch decoder means includes a digital inverter being interposed into one of said code input conductors thereof.

13. The system as claimed in claim 10, wherein said switch decoder means includes a digital inverter being interposed into one of said code input conductors thereof.

14. The system as claimed in claim 1, wherein said load decoder means comprises a digital logic gate having a plurality of input conductors, one of said input conductors serves as an input activating conductor, and said connection of said activating means to said decoder means comprises the connection of said activating means to said input activating conductor, and the others of said input conductors serve as code input conductors, and said connection of said load decoder means to said code transmission conductors comprises the connection of respective ones of said code input conductors to said code transmission conductors.

15. A system as claimed in claim 14, wherein said load decoder means includes a digital inverter interposed into one of said code input conductors thereof.

16. A system as claimed in claim 1, wherein said code generator means comprises a digital clock producing spaced electrical pulses, and digitally coded number generator means having an input pulse conductor connected to said digital clock to receive said spaced electrical pulses therefrom and having a plurality of code output conductors for producing said digitaly coded electrical pulses, and said connection of said code generator means to said code transmission conductors comprises the connection of said code output conductors to said code transmission conductors.

17. A digitally coded electrical system for an automobile which comprises a digital clock producing spaced electrical pulses, digitally coded number generator means having an input pulse conductor connected to said digital clock to receive said spaced electrical pulses therefrom and having a plurality of code output conductors and sequentially and cyclically producing digitally coded electrical pulses simultaneously in said code output conductors corresponding to respective ones of a plurality of numbers, a code transmission cable having a plurality of code transmission conductors each connected to one of said code output conductors, switch decoder means having a plurality of code input conductors, each connected to respective ones of said code transmission conductors having an output activating conductor and being coded to one of said numbers for producing a cyclic and digital activating signal in said output activating conductor as said digitally coded number generator means cyclically generates said one number, an electrical switching device having an input pole connected to said output activating conductor having an output pole and being operable between conducting and nonconducting states, load decoder means having a plurality of code input conductors, each connected to respective ones of said code transmission conductors having an input activating conductor connected to said output pole and having a power switch activating conductor for delivering a digital output signal to said power switch activating conductor when said switch decoder means and said electrical switching device cooperate to supply said cyclic and digital activating signal to said input activating conductor of said load decoder simultaneously with the supply to said load decoder means of electrical pulses that correspond to said one number, a power bus conductor, and power switching means having a switching conductor connected to said power switch activating conductor having a power input conductor connected to said power bus conductor and having a power output conductor for electrically communicating said power input conductor with said power output conductor when said digital output signal is supplied to said switching conductor and for maintaining electrical communication between said power conductors for a period of time in excess of that in which said digitally coded number generator means cyclically repeats the encoding of said one number into said transmission conductors.

18. A system as claimed in claim 17, wherein said system includes second power switching means being connected to said power bus, second load decoder means being connected to said second power switching means and to said code transmission conductors, a second electrical switching device being connected to said second load decoder means, and second switch decoder means being connected to said second electrical switching device and to said code transmission conductors, and said connection of said input activating conductor of first said load decoder means to said output pole of first said electrical switching device and said connection of said second electrical switching device to said second load decoder means comprises a common activator conductor.

19. A system as claimed in claim 18, wherein one of said power switching means comprises a solid-state switching device and a mechanical relay, said maintaining means of one of said power switching means comprises an electronic triggering circuit that includes an electrical capacitor, one of said load decoder means comprises a NAND gate and a digital inverter, one of said electrical switching devices comprises a manually actuated mechanical switch, one of said switch decoder means comprises a NAND gate and a transmission gate, and said code transmission cable comprises a flat ribbon type cable having said common activating conductor therein.

* * * * *